United States Patent
Riedmann

(10) Patent No.: US 11,873,150 B2
(45) Date of Patent: Jan. 16, 2024

(54) TRAY OR STORAGE AND TRANSPORT CONTAINER FOR PLASTIC RECEPTACLES

(71) Applicant: ALPLA Werke Alwin Lehner GmbH & Co. KG, Hard (AT)

(72) Inventor: Jürgen Riedmann, Höchst (AT)

(73) Assignee: ALPLA WERKE ALWIN LEHNER GMBH & CO. KG, Hard (AT)

(*) Notice: Subject to any disclaimer, the term of this patent is extended or adjusted under 35 U.S.C. 154(b) by 0 days.

(21) Appl. No.: 16/101,954

(22) Filed: Aug. 13, 2018

(65) Prior Publication Data
US 2018/0346182 A1 Dec. 6, 2018

Related U.S. Application Data

(63) Continuation of application No. PCT/EP2017/052774, filed on Feb. 8, 2017.

(30) Foreign Application Priority Data

Feb. 12, 2016 (CH) .................... 00192/16

(51) Int. Cl.
  B65D 6/04 (2006.01)
  B65D 21/02 (2006.01)
  B65D 6/16 (2006.01)

(52) U.S. Cl.
  CPC ............. B65D 7/08 (2013.01); B65D 7/24 (2013.01); B65D 21/0213 (2013.01); B65D 2213/02 (2013.01)

(58) Field of Classification Search
  CPC ........ B65D 7/08; B65D 7/24; B65D 21/0213; B65D 2213/02; B65D 7/26; B65D 7/28; B65D 7/30; B65D 19/08; B65D 19/12; B65D 2519/00024; B65D 21/0212; B65D 21/0215; B65D 21/0216; B65D 21/0217;
  (Continued)

(56) References Cited

U.S. PATENT DOCUMENTS 277,251 A * 5/1883 Felstead .................. B65D 7/24
                                                                    220/4.31
2,388,297 A * 11/1945 Slaughter ................ B29C 66/43
                                                                    446/87
(Continued)

FOREIGN PATENT DOCUMENTS

GB   1 078 484 A    8/1967
NL   1018048 C2    11/2002

OTHER PUBLICATIONS

International Search Report (PCT/ISA/210) dated Mar. 23, 2017, by the European Patent Office as the International Searching Authority for International Application No. PCT/EP2017/052774.
(Continued)

Primary Examiner — Andrew D Perreault
(74) Attorney, Agent, or Firm — BUCHANAN INGERSOLL & ROONEY PC

(57) ABSTRACT

An exemplary storage and transport container as provided can be easily produced, transported and mounted. The storage and transport containers can be designed and configured in such a way that electrostatic charging of the plastic receptacles that are stored therein is prevented as much as possible. The storage and transport container can also be reusable multiple times.

20 Claims, 3 Drawing Sheets

(58) Field of Classification Search
CPC .............. B65D 21/0219; B65D 21/022; B65D 21/0222; B65D 21/0223
USPC ............. 220/668, 4.32; 108/56.3, 53.1, 53.3, 108/53.5; 206/586
See application file for complete search history.

(56) References Cited

U.S. PATENT DOCUMENTS

| | | | | |
|---|---|---|---|---|
| 2,619,249 | A | * | 11/1952 | Whittington ........... B65D 21/08 220/8 |
| 2,666,552 | A | * | 1/1954 | Coit, Jr. ................. B65D 19/12 108/53.5 |
| 2,714,471 | A | | 8/1955 | Sherman |
| 3,117,692 | A | * | 1/1964 | Carpenter .......... B65D 43/0212 206/508 |
| 4,173,379 | A | * | 11/1979 | van der Heiden ... A47B 88/941 312/348.1 |
| 4,232,916 | A | | 11/1980 | Correia |
| 4,457,432 | A | | 7/1984 | Solheim |
| 4,809,851 | A | * | 3/1989 | Oestreich, Jr. ........... B65D 7/32 206/511 |
| 6,966,449 | B2 | * | 11/2005 | Williams ........... B65D 11/1873 206/509 |
| 2012/0024740 | A1 | * | 2/2012 | Gollnick ............ B65D 90/0006 206/503 |
| 2016/0068302 | A1 | * | 3/2016 | Clark ................. B65D 19/0059 108/56.3 |

OTHER PUBLICATIONS

Written Opinion (PCT/ISA/237) dated Mar. 23, 2017, by the European Patent Office as the International Searching Authority for International Application No. PCT/EP2017/052774.

Office Action dated Nov. 18, 2021, by the European Patent Office in corresponding European Patent Application No. 17703168.9. (5 pages).

* cited by examiner

TRAY OR STORAGE AND TRANSPORT CONTAINER FOR PLASTIC RECEPTACLES

RELATED APPLICATIONS

This application claims priority as a continuation application under 35 U.S.C. § 120 to PCT/EP2017/052774, which was filed as an International Application on Feb. 8, 2017 designating the U.S., and which claims priority to Swiss Application 00192/16 filed in Switzerland on Feb. 12, 2016. The entire contents of these applications are hereby incorporated by reference in their entireties.

BACKGROUND INFORMATION

The present disclosure relates to a tray or storage and transport container for plastic receptacles, such as plastic bottles.

Receptacles made of tin or multicolored sheet metal, glass or else ceramic, common in the past, are increasingly being replaced by receptacles made of plastic. In the meantime, primarily plastic receptacles are for example, used for the packaging of fluid substances, for example beverages; free-flowing foods, such as ketchup, sugo, pesto, sauces, mustard, mayonnaise, and the like; household products; care products; cosmetics, etc. The low weight and the lower costs certainly play a significant role in this substitution. The use of recyclable plastic materials, the use of bioplastics, and the overall more advantageous total energy balance in their production also contribute to promoting the acceptance of plastic receptacles, such as plastic bottles, in consumers.

After their production in a blow-molding method (extrusion-blow-molding method, stretch-blow-molding method, injection-blow-molding method), the empty plastic receptacles are either directly transported to a dispensing station, or they are loaded into containers in order to be stored intermediately and at a later time transported to a site with a dispensing station that can be placed near to or else further away from a manufacturing unit for the production of plastic receptacles. In many cases, the plastic receptacles are produced at production facilities that specialize in the production of such products and are transported from there to a manufacturer of products that are to be dispensed into the plastic receptacles. The transport can be carried out by, for example, road, rail or water.

For their storage and for transport, the plastic receptacles are loaded into storage and transport containers, so-called trays. The loading of the trays is carried out, for example, in semi- or fully-automatic loading and unloading units, which can be arranged connected to a production unit, for example a blow-molding device for plastic containers, or in front of a dispensing station.

Trays that are known can be made of, for example, cardboard. The low inherent stability in the cardboard trays, which often can result in damage to the trays, can be disadvantageous. There is also a certain risk that plastic receptacles stored in the trays will be contaminated or even damaged. The trays that are made of cardboard are susceptible to moisture and can be reused only relatively rarely. Trays that are made of plastic are also already known. In this case, the individual trays can be designed to be stackable. Plastic trays can have a disadvantage that the plastic receptacles that are stored in them can be charged electrostatically due to friction on the walls of the trays. This can then cause contaminants to be attracted. Also, plastic grit can pass into the interior of the receptacles, which should be prevented. The known plastic trays are relatively expensive to produce and because of their dimensions of up to 1,200 mm×1,200 mm×400 mm (length×width×height) in the empty state, they can be relatively cumbersome and difficult to transport. The plastic trays involve the same volume in the empty state as the filled trays. As such, for the transport of the empty plastic trays, the same amount of time and effort has to be expended as for the transport of the filled trays. Thus, for example, for the road transport of the empty plastic trays, the same number of trucks is used as for the loaded plastic trays.

SUMMARY

A tray for plastic receptacles is disclosed, comprising: an essentially orthogonal flat tray bottom; and essentially rectangular flat side walls, the side walls being configured to be detachably connected together and with the tray bottom via plug-in connections, and to have inside surfaces that are metal or metallized.

BRIEF DESCRIPTION OF THE DRAWINGS

Further advantages and features follow from the subsequent description of exemplary variant embodiments of the invention with reference to the diagrammatic drawings, which are depicted not true to scale, and which.

DETAILED DESCRIPTION

Figure 1:
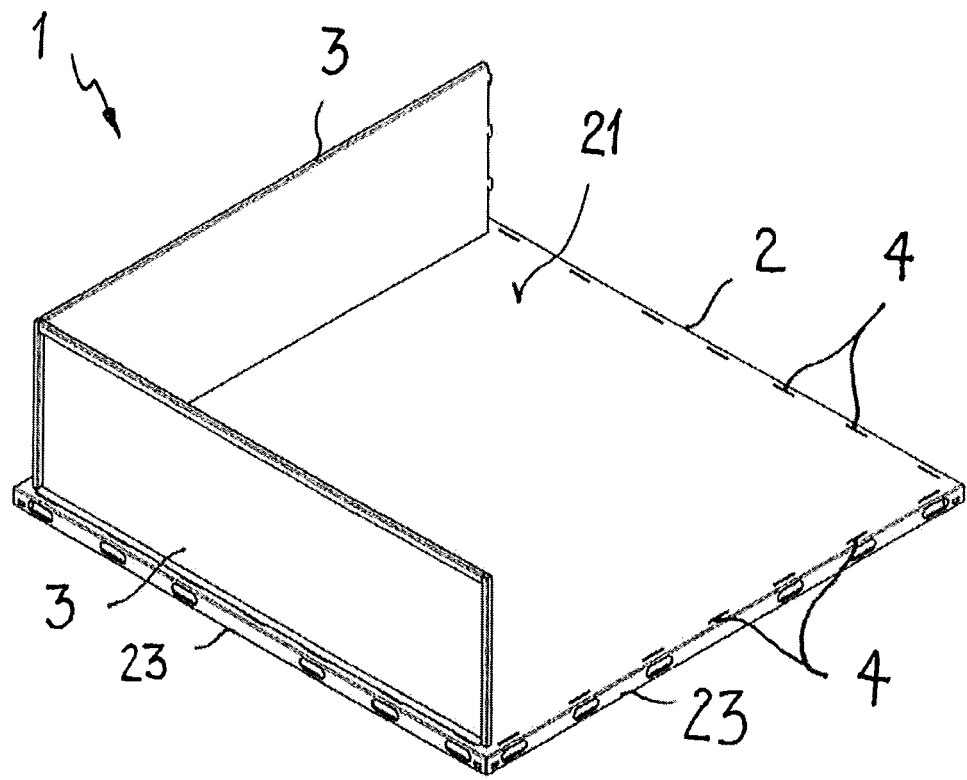
FIG. 1 shows a perspective view of a partially assembled exemplary embodiment of a tray.

Exemplary embodiments as disclosed herein can remedy drawbacks of known trays (e.g., storage and transport containers).

An exemplary Tray (e.g., storage and transport container) as provided can be easily produced, transported and mounted. The storage and transport containers can be designed and configured in such a way that electrostatic charging of the plastic receptacles that are stored therein is prevented as much as possible. The storage and transport container can also be reusable multiple times.

An exemplary tray or storage and transport container for plastic receptacles, such as for plastic bottles, as disclosed can have an essentially orthogonal flat tray bottom and essentially rectangular flat side walls. The side walls can be detachably connected together and to the tray bottom with plug-in connections, and the walls can have inside surfaces that are designed and configured to be metal or metallized.

The side walls can be assembled with one another and with the tray bottom without tools. For transport in the empty state, the trays can be separated into their individual parts without tools. The volume occupied by the trays is thus considerably reduced, and the transport thereof can be performed much more easily, economically and ecologically. At the target site, the trays can again be very easily assembled without tools. By having at least the inside surfaces of the side walls that point into the interior of the tray as metal or metallized, static charging of the plastic containers that are stored and transported inside the tray is counteracted. As a result, an attraction of dirt particles can be avoided. The metal or metallized inside surfaces at least of the side walls also counteract plastic grit.

Furthermore, the side walls and the tray bottom can be configured to be closed, i.e., they have no openings. Thus, no contaminants can penetrate through the side walls and the tray bottom into the interior of the tray, which penetration could contaminate the plastic receptacles.

Furthermore, the tray can be closed by a cover in order also to prevent a penetration of contaminants from a side that is opposite to the tray bottom. In this way, the tray bottom can be designed and configured as a cover. The tray bottom can have a top and a base that is opposite to the top, at a distance from it, and permanently connected to it by means of a side panel. The top can have fastening agents that are used to fasten the side walls to the tray bottom. The base of the tray bottom can be formed in such a way that the tray bottom can be mounted on the free longitudinal edges of the side walls. After being mounted on the side walls, the tray bottom can be lifted from the side walls in the opposite direction. The base of the tray bottom can be designed and configured in such a way that the tray bottom that is mounted on the side walls is centered on the inner sides of the side walls or on the outer sides thereof.

In an exemplary embodiment, the base of the tray bottom recedes towards the top in such a way that the base of the tray bottom forms a panel that at least partially embraces the side walls on their outer sides. In addition, the panel can have an inclined insertion surface that facilitates putting the base of the tray bottom over the outer sides of the side walls. The panel can also be designed and configured in such a way that it rests with zero play at least partially on the outer sides of the side walls. In an exemplary embodiment, the zero play can be generated in that the panel rests non-positively, for example elastically, at least on partial areas of the outer sides of the side walls. In this way, the tray bottom can be detached in its function as a cover with the (underlying) side walls in the vertical direction and can be attached with zero play in the horizontal plane, i.e., in the translational and rotational direction. This zero-play attachment can make it possible for the trays to be stacked on top of one another to form towers that are up to 4 m and higher. In addition, the panel can rest circumferentially on the outer sides of the side walls. In this way, a penetration of contaminants into the area of the cover can be avoided as much as possible. The tray bottom can be a one-piece bent sheet-metal part.

In an exemplary variant embodiment, the trays can have a rectangular tray bottom. Then, respectively two side walls, which are opposite to one another in the assembled state, are designed and configured to be similar. In another exemplary variant embodiment, the tray bottom can also be made in the form of a square. In this case, all four side walls are designed to be similar. This facilitates the production of the trays, in particular the side walls, and their storage and logistics.

For the creation of plug-in connections, each side wall has a number of connecting projections that are designed and configured essentially in the shape of a hook, which projections project from their one side edge. On its opposite longitudinal end, a side wall is equipped with a corresponding number of mounts for connecting projections of an adjacent side wall, which mounts are arranged on top of one another and made in the inside surface. In addition, the side walls are equipped with projecting locking straps on a longitudinal edge that runs perpendicular to the side edges. The locking straps are used for plug-in connection of the side walls with the tray bottom, such as the top of the tray bottom, which for this purpose is equipped with corresponding sockets along its four sides. In principle, the locking straps could also project from the tray bottom, and the corresponding sockets could also be made in the longitudinal edge of a side wall. For production reasons and because of the lower risk of damage to the locking straps during transport of the trays that have been taken apart, however, the arrangement of the locking straps on the side walls and the provision of sockets in the tray bottom have proven suitable. In another exemplary variant embodiment, the sockets are made in an inner side of the tray bottom.

An exemplary variant embodiment of the trays, which is distinguished by its economical producibility, calls for at least the side walls to be designed and configured as profile metal sheets. Sheets are easy to produce and process. Their inherent rigidity can be reinforced by means of appropriately attached crimps and ridges.

In another exemplary variant embodiment, at least the free longitudinal edge and the longitudinal end of the side wall designed as a profile sheet, equipped with the mounts, are designed as folded parts. As a result, the stiffness of the side walls can be still further increased.

An exemplary embodiment can provide that the tray bottom is also designed and configured as a profile sheet. To increase the stiffness of the tray bottom, all four sides of the tray bottom can be bent.

Aluminum or steel is suitable as a material for the profile sheets. Here, the aluminum sheets are for example made of anodized aluminum, or the steel sheets are generally made of stainless steel. To manufacture the side walls and the tray bottom, aluminum that is already anodized can be stamped, deburred and then bent. Even though an anodized coating per se is not electrically conductive, it has still been shown that the trays, which were made of side walls and tray bottoms according to above-depicted methods, effectively prevent in the assembled state static charging of bottles that are packed into the trays. The wall thickness of the sheets can be, for example, approximately 0.5 mm to 3 mm, preferably, 1 mm to 2 mm.

In another exemplary variant embodiment, the tray bottom and the side walls are designed and configured as stamped sheet-metal parts. In addition to stamping, the sheet blanks can also be manufactured by water-jet cutting or laser cutting, whereby the sheet blanks are bent into the predetermined shape in downstream operating steps, and in this way, a profile sheet is produced. By the elimination of any type of machining treatment of the individual components, chips can be avoided, which otherwise could possibly contaminate the plastic containers.

Another exemplary variant embodiment can provide that side panels of the tray bottom, which permanently connect the top and the base together and are flush with one another in the corners, are stiffened with corner connectors. The corner connectors can be pressed or driven in from the base in the direction of the top and connect the respectively adjoining side panels. The corner connector is connected positively to each of the two side panels. The positive fit can be supported by additional traction. Such stiffened corners can prevent the adjoining side panels, which would not be connected together without the corner connectors, from being pressed apart by the stresses on the tray bottom. The side panels can have openings in which specially-formed grapplers can engage in order to lift the tray bottoms, or the trays or stack of trays.

In an exemplary variant embodiment, the tray bottom can have dimensions that are up to 1,400 mm×1,200 mm. In a square variant embodiment of the tray, its outside dimensions are up to 1,200 mm×1,200 mm. The height of a tray is variable and can be from 150 mm to 400 mm.

In another exemplary variant embodiment of the tray, the tray bottom can be designed and configured in such a way that free longitudinal edges of the side walls of a tray arranged underneath can respectively be rigidly encompassed by its base. This variant embodiment can be particularly advantageous for the stackability of several trays on top of one another.

Another exemplary variant embodiment of a tray can provide that the tray comprises a panel which is configured in such a way that said panel which embraces a free longitudinal edge of a sidewall of the tray ha a spring action. As a result, when trays are stacked on top of one another, an automatic, non-positive attachment of the trays to one another results.

Not only can the trays according to the present disclosure be taken apart and reassembled without tools, but they can also be stacked. In this case, a stack of trays can include a number of trays that are arranged on top of one another and that can be designed and configured according to one of the above-described exemplary variant embodiments. In this case, the tray bottom of an upper tray respectively forms a cover for a tray that is arranged immediately underneath. The tray bottoms in this case are designed and configured in such a way that their bases respectively rigidly encompass the free longitudinal edges of the side walls of the trays that are arranged underneath and hold the latter for example under a certain pretensioning. Inclined insertion surfaces can be provided on the bases of the tray bottoms, which insertion surfaces facilitate the mounting of the upper tray on the free longitudinal edges of the side walls of the tray that is arranged underneath. A wall of the tray bottom that embraces the free longitudinal edges of the side walls can have a spring action. Furthermore, the wall can have a single hem on its free end. The term "single hem" is defined as the edge being put into the shape of a U in such a way that the inner sides of the two legs that are opposite to one another touch at least partially. In this way, on the one hand, the wall can be reinforced, and thus the spring force can be increased, and, on the other hand, in addition, edge protection can be provided, which protection rounds off the sharp-edged sheet and protects the side walls of the tray, which is arranged underneath in a stack, from being cut or scratched.

An exemplary variant embodiment can also provide for the tray that is arranged in the uppermost position to have a cover that is pushed onto the free longitudinal edges of the side walls of the uppermost tray in a captive and detachable manner. For example, the cover can be a tray bottom. Furthermore, the uppermost tray can also be closed by means of a transport bottom. This transport bottom, on which the tray bottom of the lowermost tray of trays that are stacked on top of one another is arranged, is for example, made of sheet steel, such as sheet steel that is rust-resistant, and generally heavier, more resilient and more resistant to applications of force from outside, such as pushing or shoving, than the bottom tray, which is generally made of aluminum. The transport bottom can be designed and configured like the bottom tray. In this case, inclined insertion surfaces can also be designed and configured.

The transport bottom generally can also have side walls, which, however, are only high enough that they do not touch the top of the tray bottom when the base of the tray bottom lies completely flat on a top of the transport bottom. The side walls can be detachably connected to the transport bottom analogously to the design of the tray or else can be permanently connected to the latter, such as, for example, by soldering or welding. When the transport bottom is designed and configured as a tray bottom, the latter can also be used as a tray bottom of the lowermost tray. The lowermost tray is thus distinguished with respect to the material of its tray bottom, such as steel, from the trays stacked on top of it, in which the tray bottom generally is made of for example aluminum. In this exemplary configuration, the lowermost tray with its tray bottom that is made of steel offers the same advantages with respect to resilience and resistance to applications of force from outside as a tray, arranged on a transport bottom, with a tray bottom that is made of aluminum. The plastic containers that are arranged in a stack of trays are completely protected against contaminants by the locking cover, which can be designed and configured as a tray bottom or transport bottom.

The lowermost tray can have a tray bottom, on whose base feet are arranged. The arrangement and design of the feet in this case can be selected in such a way that the fork of a movable lifting device, for example a forklift or a pallet truck, can be driven under the tray bottom of the lowermost tray in order to lift and/or transport the stack of trays. The feet can also be on the side panels. Such feet can also be on a transport bottom.

The maximum overall height of a stack of trays can be up to 4,000 mm. In principle, even greater stack heights are possible. For the sake of the stability of the stack of trays while said stack is being transported and handled, the cited maximum height is, however, preferred.

A tray or storage and transport container for plastic receptacles, such as plastic bottles, depicted in FIG. 1, is given the overall reference number 1. It includes an essentially orthogonal flat tray bottom 2 with a top, which is named inner side 21 below, and essentially rectangular side walls 3, which are connected together via plug-in connections and to the tray bottom 2. To this end, sockets 4 are recessed in the inner side 21 of the tray bottom 2, which sockets are arranged along the four side panels 23 of the tray bottom 2. The side walls 3 project approximately perpendicularly from the tray bottom 2. The tray 2 that is depicted in FIG. 1 is only partially assembled; in particular, only two side walls 3 are depicted. It is understood that a completely assembled tray 1 has four side walls 3.

The tray 1 that is depicted in FIG. 1 has a square tray bottom 2. Accordingly, the four side walls 3 are designed to be similar or have the same longitudinal extension. In an alternative exemplary variant embodiment, the tray bottom can be made rectangular. Then, respectively two side walls, which lie opposite one another in the assembled state, are designed to be similar or respectively of equal length. In the rectangular variant embodiment, the tray bottom can have dimensions that are up to 1,400 mm×1,200 mm. In the case of a square variant embodiment of the tray 1, its outside dimensions are up to 1,200 mm×1,200 mm. The height of a tray 1 is variable and can be from 150 mm to 400 mm. The height of a tray 1 in this case includes (e.g., consists of) the height of the tray bottom 2 and the height of the inserted side walls 3.

Figure 2:
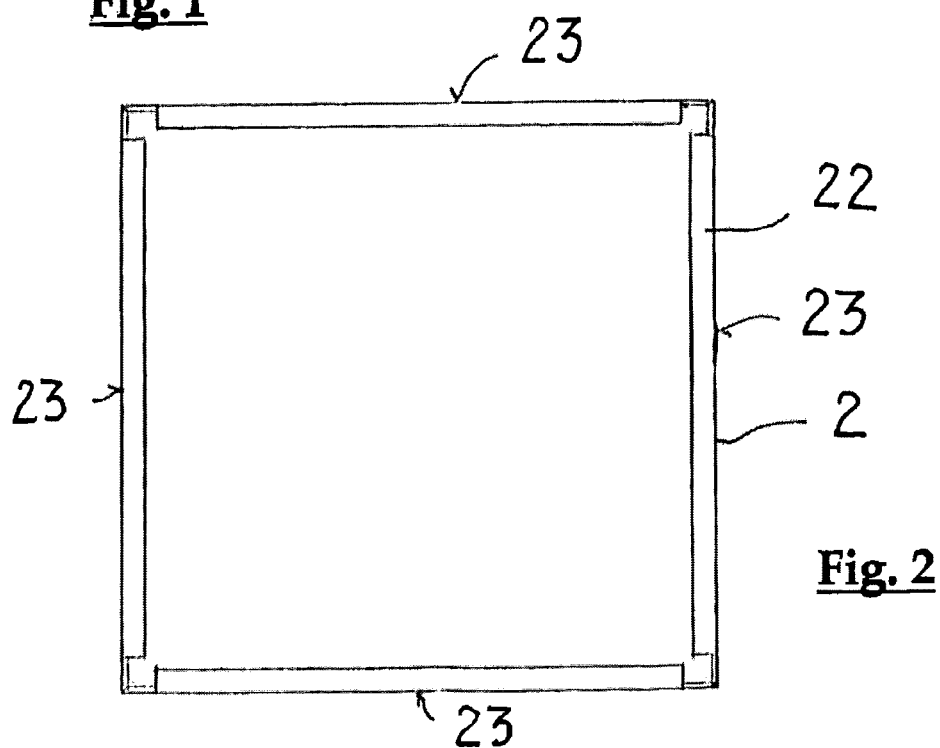
FIG. 2 shows an exemplary base of a tray bottom.

FIG. 2 shows a bottom view of the tray bottom 2. The top of the tray bottom 2 that is referred to as the inner side 21 is connected to a base 22 by means of four side panels 23.

It is readily evident that the base 22 is recessed in its corners but the side panels 23 are flush with one another.

Figure 3:
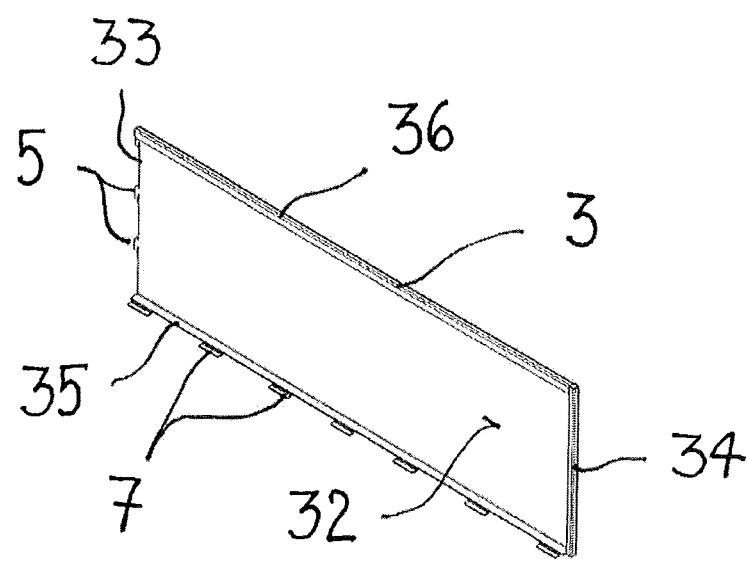
FIG. 3 shows a perspective view of an exemplary side wall.
Figure 4:
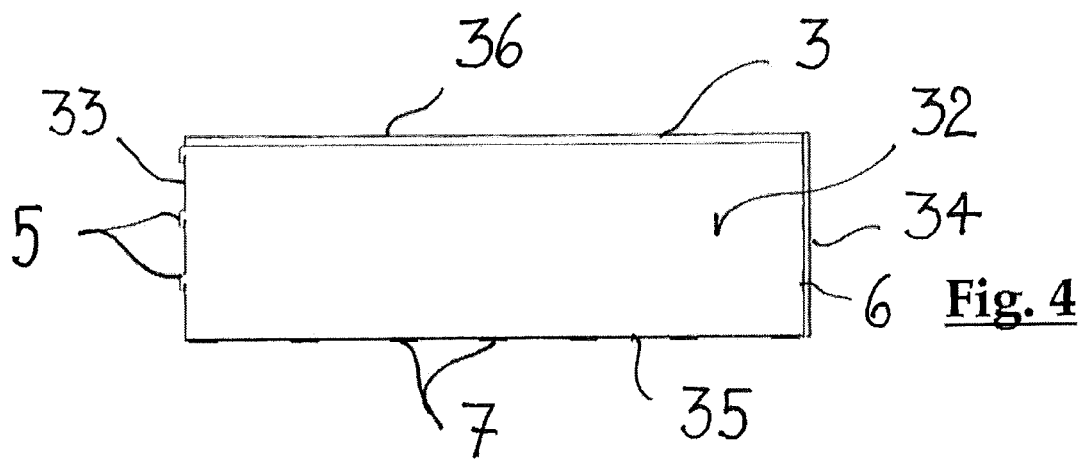
FIG. 4 shows a top view of an exemplary outside surface of the side wall.
Figure 5:
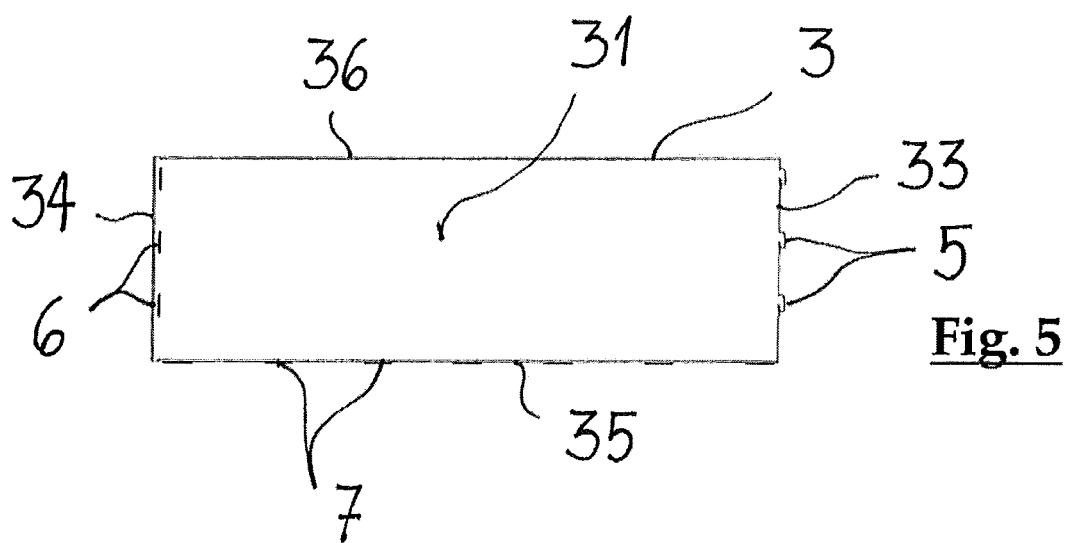
FIG. 5 shows a top view of an exemplary inside surface of the side wall.

FIGS. 3 to 5 show various views of, for example, a side wall 3. The side wall 3 has an inside surface 31 and an outside surface 32. Hook-shaped connecting projections 5 project from a side edge 33 of a longitudinal end of the side wall 3. The connecting projections 5 are arranged on top of one another some distance apart. On the opposite longitudinal end 34 of the side wall 3, mounts 6 for the connecting projections 5 on the side edge of the adjacent side wall are recessed in their inside surface 31. The number and the arrangement of the mounts 6 correspond to the number and arrangement of the connecting projections 5.

The mounts 6 completely penetrate the side wall 3, as is indicated in FIG. 4. Locking straps 7 are arranged on a lower longitudinal edge 35 of the side wall 3 in the assembled state. The locking straps 7 project from the longitudinal edge 35 and extend in the direction of the outside surface 32 of the side wall 3. The locking straps 7 are used to mount the side wall 3 on the tray bottom 2 and are inserted into the sockets 4 in the inner side 21 of the tray bottom 2 (FIG. 1). A longitudinal edge 36 that is free in the assembled state of the side wall 3 and the free longitudinal end 34 of the side wall 3 that is equipped with the mounts 6 are bent in an outward-projecting U shape. Thus, flat inside surfaces 31 are produced on the finished assembled tray over its entire inside height. The U-shaped bend of the longitudinal end 34 is made in the same way and in the same direction as the U-shaped bend of the longitudinal edge 36. One leg of the U-shaped bend of the longitudinal end 34 overlaps the outside surface 32 far enough that the connecting projections 5 of the adjacent side wall, suspended in the mounts 6, are overlapped. The longitudinal edge 35 of the side wall 3 that carries the locking straps 7 is for example angled by approximately 90° (e.g., +/−10%) in the direction of the outside surface 32. An improved seating of the side wall 3 on the inner side 21 of the tray bottom 2 can be thus produced.

In principle, it would be sufficient if at least the inside surfaces 31 of the side walls 3 are designed and configured to be metal or metalized. For production reasons, it has proven suitable when the side walls 3 overall include (e.g., consist of) metal, in particular anodized sheet aluminum or a stainless sheet steel. Also, the tray bottom 2 can be made of metal, in particular an anodized sheet aluminum or a stainless sheet steel. To generate electrically-conductive connections, the side walls 3 made of anodized sheet aluminum and tray bottoms 2 made of anodized sheet aluminum are stamped, deburred and bent, and the trays 1 are mounted on these side walls 3 and tray bottoms 2 made by the above-described method. In this case, the side walls 3 and the tray bottom 2 are designed and configured completely as stamped parts. Machining of components is eliminated. The sheets have a wall thickness of, for example, 0.5 mm to 3 mm, preferably for example between 1 mm and 2 mm.

Figure 6:
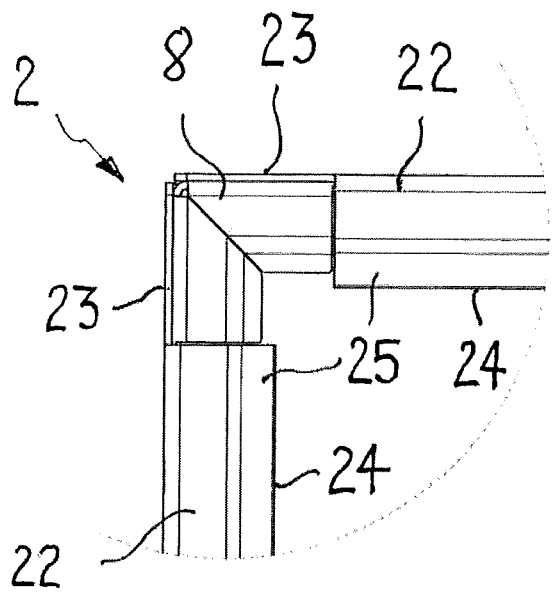
FIG. 6 shows an enlarged depiction of an exemplary corner section of two side walls, connected together, and a tray bottom with an inserted corner connector.

On an enlarged scale, FIG. 6 shows a detail from a base of the tray bottom 2, in which two flush side panels 23 are permanently mechanically connected together by means of a corner connector 8. Thus, an integral connection such as welding or soldering of the side panels 23 is unnecessary. Furthermore, an inclined insertion surface 25 of the base 22 and a wall 24 that connects to the inclined insertion surface 25 is evident. As is evident in FIG. 9, the wall 24 and the top 21 enclose an angle that is greater than for example, 90°. In general, the enclosed angle is for example, from approximately 91° to approximately 95°. An angle that is enclosed by the inclined insertion surfaces 25 and the top 21 is in general approximately 15° to approximately 45°, preferably approximately 30°.

Figure 7:
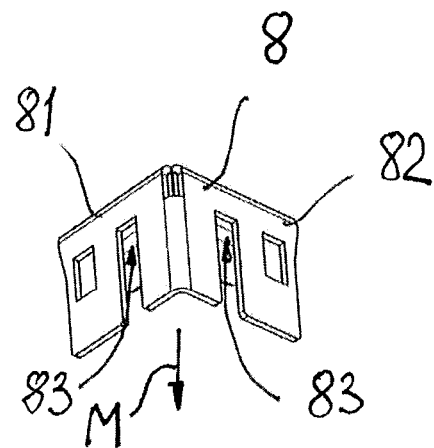
FIG. 7 shows an exemplary embodiment of a corner connector.

FIG. 7 shows an embodiment of a corner connector 8, which has two legs 81, 82 that run perpendicular to one another. Each of the legs 81, 82 has a hook 83, which is made from the leg 81, 82. In this case, the hook extends in a mounting direction of the corner connector 8, which is referred to by an arrow M. The opening of the hook faces away from the mounting direction 84. The corner connector 8 can be made of a rust-resistant steel and is designed and configured as a one-piece stamped part/curved part. To lock the corner connector 8 to the tray bottom 2, the side panels 23 have hooks, also not depicted in this embodiment, which extend crosswise to the mounting direction. In the mounting of the corner connector 8, the hooks 83 of the corner connector 8 engage behind the hooks of the side panels 23. The hooks of the corner connectors 8 and the side panels 23 that correspond to one another are sized such that after the corner connectors 8 are mounted, they ensure a non-positive connection that cannot automatically become detached. For mounting the corner connector 8, the latter is pressed or driven in.

Figure 8:
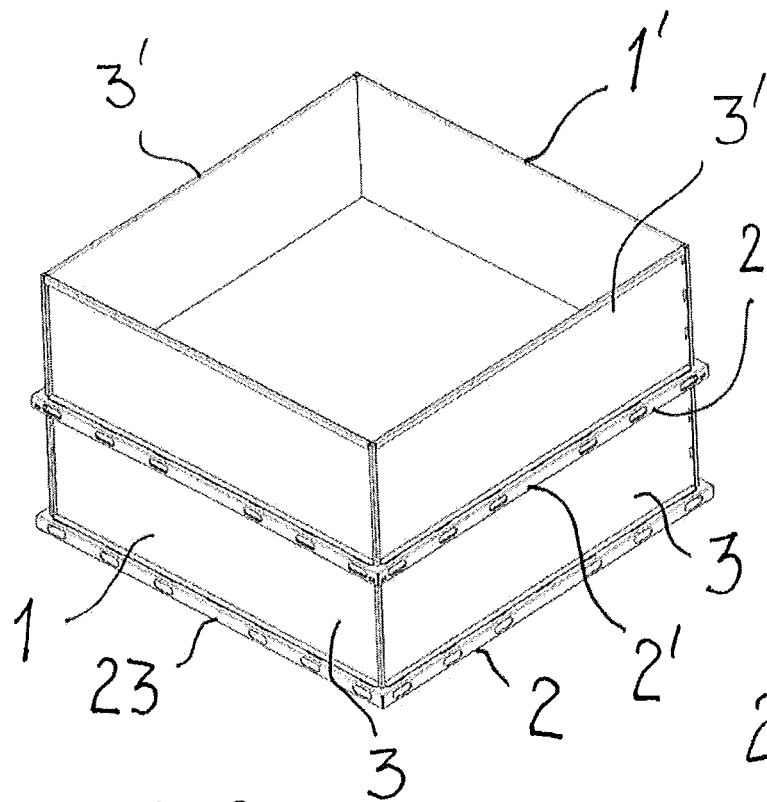
FIG. 8 shows a perspective view of two exemplary trays that are stacked on top of one another.

FIG. 8 depicts two trays 1, 1' that are stacked on top of one another. The two trays 1, 1' are designed and configured to be similar and respectively include a tray bottom 2, 2' and side walls 3, 3' that are connected together via plug-in connections and to the respective tray bottom 2, 2'. The depiction in turn shows trays 1, 1' with square tray bottoms 2, 2'. It is understood, however, that the tray bottoms can also be rectangular. The tray bottoms 2, 2' have respectively four side panels 23, 23' that are designed and configured to be similar.

Figure 9:
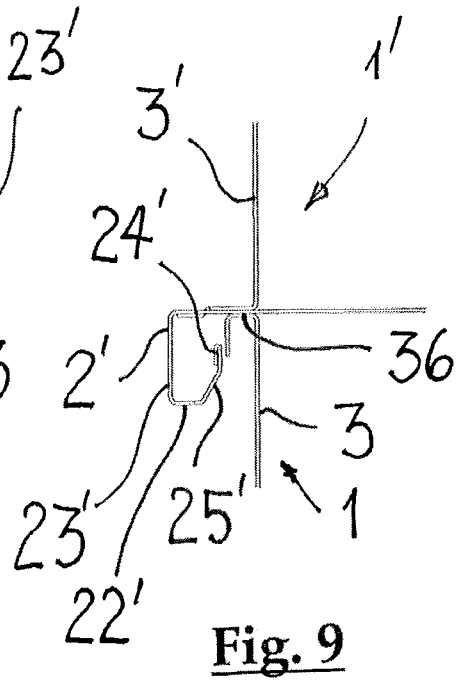
FIG. 9 shows an enlarged sectional view of a section of two exemplary trays that are stacked on top of one another.

FIG. 9 shows a diagrammatic sectional view of a cross-section of the two trays 1, 1' that are stacked on top of one another. The depiction shows a side wall 3' that is inserted into the tray bottom 2' of the upper tray 1' and a side wall 3 of the lower tray 1. The wall 24' of the base 22' of the tray bottom 2' of the upper tray 1' extends over the free longitudinal edge 36 of the side wall 3 of the lower tray 1. The base 22' of the upper tray bottom 2' is in this case, for example, bent in such a way that the wall 24' is designed as an elastic section that connects to the entry slope 25'. The entry slope 25 facilitates the mounting of the tray bottom 2' of the upper tray 1' onto the free longitudinal edge 36 of the side wall 3 of the lower tray 1. The elastic section 24' presses with pretensioning against the free longitudinal end 36 of the side wall 3 of the lower tray 1. As a result, the two trays 1, 1' that are stacked on top of one another are held together with a certain traction. The pretensioning also prevents the plugged-together components 2, 3 from rattling.

The trays can be stacked on top of one another, for example, up to a maximum height of for example, 4,000 mm. The uppermost tray of a stack of trays can be closed with a cover. The cover can be designed and configured in this case as a tray bottom 2 that is depicted in FIG. 2.

Finally, the lowermost tray of a stack of trays can have a tray bottom, on whose base feet are arranged. The tray bottom of the lowermost tray can be produced from rust-resistant sheet steel and thus is distinguished from the tray bottoms of the other trays of the stack that are produced from sheet aluminum, such a from anodized sheet aluminum. The arrangement and design of the feet can in this case be selected in such a way that the fork of a movable lifting device, for example a forklift or a pallet truck, can be driven under the tray bottom of the lowermost tray, in order to lift and/or transport the stack of trays.

The trays or storage and transport containers for plastic receptacles, such as for plastic bottles, which are described by way of example, can be assembled without tools. For transport in the empty state, the trays can be separated into their individual parts. As a result, the volume occupied by the trays is considerably decreased, and their transport can be performed much more easily, economically and ecologically. At the target site, the trays can be assembled again very easily without tools. The metal design of at least the inside surfaces of the side walls counteracts the problem of a static charging of the plastic containers that are stored and transported inside the trays. As a result, an attraction of dirt particles can be avoided. The metal or metalized inside surfaces of at least the side walls also counteract plastic grit. A complete design of the trays as stamped parts made of sheet metal, for example, anodized aluminum or stainless steel, with complete elimination of the machining of the components is desirable for production reasons and also for safety reasons.

The description above of specific exemplary embodiments is used only to explain embodiments of the invention and is not to be considered to be limiting. Rather, the invention is defined by the claims and the equivalents that are clear to one skilled in the art and consist of generally inventive ideas.

As such, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A tray for plastic receptacles, comprising:
  an essentially orthogonal flat tray bottom that is a one-piece sheet metal, the tray bottom comprising
    a top;
    a base that is opposite to the top; and
    a plurality of side panels, each side panel extending a length defined by an entire distance between two adjacent corners of the tray bottom, each side panel including a connection that connects the top and the base together, the connection extending said length between the respective two adjacent corners, each side panel being flush with corners of the tray bottom, whereby two respectively adjoining side panels are connected together by a corner connector;
  a plurality of essentially rectangular side walls, wherein:
    each side wall is flat and configured to be closed;
    each side wall includes a first side, a second side, a third side, and a fourth side;
    each side wall is detachably connected to at least one other side wall and to the tray bottom via plug-in connections, wherein three sides of the first side, the second side, the third side, and the fourth side include the plug-in connections, wherein the side of the side wall not having the plug-in connections is a free side;
    each side wall includes an inside surface and an outside surface;
    each sidewall is made of sheet metal for preventing electrostatic charging of a plastic receptacle that is stored in the tray;
  wherein the base includes a wall section that runs parallel to a side panel of the plurality of side panels, a base section that runs perpendicular to the side panel, and an insertion surface extending at an angle from the base section.

2. The tray according to claim 1, comprising:
  at least two side walls that are positioned to be opposite to one another in an assembled state.

3. The tray according to claim 1, wherein each side wall includes a plurality of essentially hook-shaped connecting projections projecting from a first edge of the side wall, and a plurality of mounts on a second edge of the side wall, the second edge being opposite the first edge, the plurality of mounts arranged on top of one another and made in the inside surface for receiving the plurality of projections of a connecting side wall.

4. The tray according to claim 1, wherein:
  the tray bottom includes a plurality of sockets for locking straps, the plurality of sockets projecting from an edge of the tray bottom that runs perpendicular to a side edge of a side wall.

5. The tray according to claim 4, wherein the at least one socket is on an inner side of the tray bottom.

6. The tray according to claim 1, wherein at least one side wall is a profile sheet.

7. The tray according to claim 1, wherein the tray bottom is a profile sheet.

8. The tray according to claim 7, wherein the profile sheet consists of sheet aluminum, anodized sheet aluminum, or rust-resistant sheet steel.

9. The tray according to claim 1, wherein the base of the tray bottom has dimensions that are up to 1,400 mm×1,200 mm.

10. The tray according to claim 9, wherein the tray has a height of 150 mm to 400 mm.

11. The tray according to claim 1, wherein the tray bottom is configured such that the free side of at least one side wall is arranged underneath the tray bottom and is rigidly encompassed by the base of the tray.

12. The tray according to claim 1, wherein a portion of at least one side panel is configured as a spring.

13. A stack of trays in combination, the combination comprising:
  a plurality of trays that are arranged on top of one another, wherein each of the trays is configured to according to claim 1.

14. The stack of trays according to claim 13, wherein a tray bottom of a lowermost tray consists of:
  rust-resistant sheet steel.

15. The stack of trays according to claim 12, wherein a stack height is up to 4,000 mm.

16. The tray according to claim 1, wherein the base of the tray bottom is configured to spring back in the direction of the top in such a way that the base of the tray bottom forms a wall that at least partially includes at least one side panel on its outer side.

17. The tray according to claim 16, wherein the base extends from the at least one side panel, the base being perpendicular to the at least one side panel, and an inclination insertion surface that is inclined relative to the top extends from the base and facilitates putting the base of the tray bottom over an outer side of at least one side wall of a second tray.

18. The tray according to claim 1, wherein the corner connector has first and second legs arranged perpendicular to one another, each of the legs having a first hook, each side wall having at least one corresponding second hook.

19. The tray according to claim 1, wherein:
an edge of the free side of at least one side wall has an outward-projecting U shape.

20. The tray according to claim 12, wherein the at least one side panel has a flat hem.

\* \* \* \* \*